US010706000B2

(12) United States Patent
Shiau et al.

(10) Patent No.: US 10,706,000 B2
(45) Date of Patent: Jul. 7, 2020

(54) MEMORY CARD ACCESS MODULE AND MEMORY CARD ACCESS METHOD

(71) Applicant: REALTEK SEMICONDUCTOR CORPORATION, Hsinchu (TW)

(72) Inventors: Jiunn-Hung Shiau, Taipei (TW); Neng-Hsien Lin, Kaohsiung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/855,182

(22) Filed: Dec. 27, 2017

(65) Prior Publication Data

US 2018/0276177 A1   Sep. 27, 2018

(30) Foreign Application Priority Data

Mar. 22, 2017   (TW) .............................. 106109480 A

(51) Int. Cl.
*G06F 13/42*   (2006.01)
*G06F 13/40*   (2006.01)
*G06F 13/38*   (2006.01)
*G06F 11/30*   (2006.01)

(52) U.S. Cl.
CPC ...... *G06F 13/4282* (2013.01); *G06F 11/3041* (2013.01); *G06F 11/3051* (2013.01); *G06F 11/3055* (2013.01); *G06F 11/3089* (2013.01); *G06F 13/385* (2013.01); *G06F 13/4022* (2013.01); *G06F 13/4081* (2013.01); *G06F 2213/0026* (2013.01); *G06F 2213/1602* (2013.01); *G06F 2213/3804* (2013.01)

(58) Field of Classification Search
USPC ......................................... 710/105, 313–315
See application file for complete search history.

(56) References Cited

U.S. PATENT DOCUMENTS

| | | | |
|---|---|---|---|
| 2009/0279889 A1* | 11/2009 | Kirkpatrick | H04B 10/25752 398/41 |
| 2010/0049878 A1* | 2/2010 | Yu | G06F 13/385 710/11 |
| 2013/0151750 A1* | 6/2013 | Kanigicherla | G06F 13/4022 710/313 |
| 2014/0280960 A1* | 9/2014 | Paramasivam | H04L 47/70 709/226 |

* cited by examiner

*Primary Examiner* — Ilwoo Park
(74) *Attorney, Agent, or Firm* — WPAT, PC

(57) ABSTRACT

This invention discloses a memory card access module and a memory card access method. The memory card access method is applied to an electronic device. A processing unit of the electronic device accesses a memory card through a memory card slot. The method includes steps of: detecting whether the memory card supports a Peripheral Component Interconnect Express (PCIe) interface; when the memory card does not support the PCIe interface, controlling the processing unit to access the memory card through a first data transmission path and performing data format conversion between a transmission interface and the PCIe interface using a memory card access unit disposed on the first data transmission path; and when the memory card supports the PCIe interface, controlling the processing unit to access the memory card through a second data transmission path that allows the processing unit and the memory card to transmit data through the PCIe interface.

9 Claims, 9 Drawing Sheets

MEMORY CARD ACCESS MODULE AND MEMORY CARD ACCESS METHOD

BACKGROUND OF THE INVENTION

1. Field of the Invention

The present invention generally relates to a Peripheral Component Interconnect Express (PCI-Express, PCIe for short) interface, and, more particularly, to PCIe memory cards.

2. Description of Related Art

FIG. 1 is a block diagram showing a memory card connected to a conventional electronic device. The electronic device 10 (e.g., a desktop computer, a laptop computer, a tablet, a mobile phone, etc.) includes a processing unit 110, a memory card access unit 130, and a memory card slot 150. The processing unit 110 accesses the memory card 15 inserted in the memory card slot 150 through the memory card access unit 130. The transmission interface 120 between the processing unit 110 and the memory card access unit 130 is, for example, a common PCIe interface. The transmission interface 140 between the memory card access unit 130 and the memory card 15 is, for example, a common secure digital (SD) interface. The main function of the memory card access unit 130 is to provide data format conversion between the PCIe interface and the SD interface.

Since the PCIe interface becomes more prevalent nowadays, the memory card 15 may adopt a PCIe interface in the future and can accordingly communicate with the processing unit 110 directly; in other words, it is not necessary for the memory card 15 to communicate with the processing unit 110 through the memory card access unit 130. However, during the transition between modern memory cards (PCIe memory cards) and old-fashioned memory cards (SD memory cards), the manufacturer of the electronic device 10 very likely designs the electronic device 10 to have the capability of reading both kinds of memory cards. Unfortunately, since the processing unit 110 provides only a limited number of PCIe lanes, if the manufacturer of the electronic device 10 allocates the PCIe lanes of the processing unit 110 to SD memory cards, which are accessed through the memory card access unit 130, and PCIe memory cards, which are directly accessed, the support for other peripherals of the electronic device 10 will be sacrificed. For example, the peripherals may include display cards, wireless communication modules (e.g., WIFI, Long Term Evolution (LTE), Bluetooth, etc.), wired communication modules (e.g., Ethernet), storage devices (e.g., a solid-state drive), universal serial bus (USB) control modules, etc.

In addition, when the electronic device 10 supports both the old-fashioned memory cards and the modern memory cards at the same time, the user must identify the type of the memory card before inserting the memory card in the memory card slot 150, causing inconvenience in use. Further, when the processing unit 110 accesses the memory card 15 directly, the data transmission performance may be degraded, or an access error may even occur due to poor contact between the memory card 15 and the memory card slot 150.

SUMMARY OF THE INVENTION

In view of the issues of the prior art, an object of the present invention is to provide a memory card access module and a memory card access method, so as to make an improvement to the prior art.

A device for accessing a memory card is disclosed. The device is coupled between a processing unit and a memory card slot and includes a detection unit, a selection unit, a memory card access unit, and a control unit. The detection unit detects whether the memory card supports a Peripheral Component Interconnect Express (PCIe) interface. The selection unit selects a first data transmission path or a second data transmission path. The second data transmission path allows the processing unit and the memory card to transmit data through the PCIe interface. The memory card access unit, coupled to the selection unit and disposed on the first data transmission path, accesses the memory card and provides data format conversion between a transmission interface and the PCIe interface. The control unit, coupled to the detection unit, the memory card access unit and the selection unit, controls the selection unit to select the second data transmission path when the detection unit indicates that the memory card supports the PCIe interface, and controls the selection unit to select the first data transmission path when the detection unit indicates that the memory card does not support the PCIe interface.

A memory card access method is disclosed. The method is applied to an electronic device. A processing unit of the electronic device can access a memory card via a memory card slot. The method includes steps of: detecting whether the memory card supports a PCIe interface; controlling the processing unit to access the memory card through a first data transmission path, and using a memory card access unit disposed on the first data transmission path to conduct data format conversion between the PCIe interface and a transmission interface when the memory card does not support the PCIe interface; and controlling the processing unit to access the memory card through a second data transmission path that allows the processing unit and the memory card to transmit data through the PCIe interface when the memory card supports the PCIe interface.

A device selectively accessing a PCIe device directly is disclosed. The device is coupled between a processing unit and a slot and includes a detection unit, a selection unit, a memory card access unit, and a control unit. The detection unit detects whether a device connected to the slot is the PCIe device. The selection unit selects a first data transmission path or a second data transmission path. The second data transmission path allows the processing unit and the PCIe device to transmit data through a PCIe interface. The memory card access unit, coupled to the selection unit and disposed on the first data transmission path, accesses a memory card and provides data format conversion between a transmission interface and the PCIe interface. The control unit, coupled to the detection unit, the memory card access unit and the selection unit, controls the selection unit to select the second data transmission path when the detection unit indicates that the device is the PCIe device, and controls the selection unit to select the first data transmission path when the detection unit indicates that the device is not the PCIe device.

The memory card access module and the memory card access method of the present invention enable an electronic device to share a same PCIe interface by directly accessing the PCIe devices or indirectly accessing the non-PCIe devices through the same PCIe interface, thereby reducing the number of the PCIe lanes in use. When applied to the access of the PCIe memory cards, the present invention provides a user-friendly interface. In addition, circuits associated with signal transmission enhancement can also be added to the present invention to improve memory card access performance and reduce the chance of access errors.

Compared with the complex circuit of a conventional PCIe switch, the present invention achieves the purpose of sharing a PCIe interface with a simple circuit, which not only saves costs but also reduces the difficulty of circuit design.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a memory card access module and a memory card access method. On account of that some or all elements of the memory card access module could be known, the detail of such elements is omitted provided that such detail has little to do with the features of this disclosure and this omission nowhere dissatisfies the specification and enablement requirements. People of ordinary skill in the art can choose components or steps equivalent to those described in this specification to carry out the present invention, which means that the scope of this invention is not limited to the embodiments in the specification.

Figure 1:
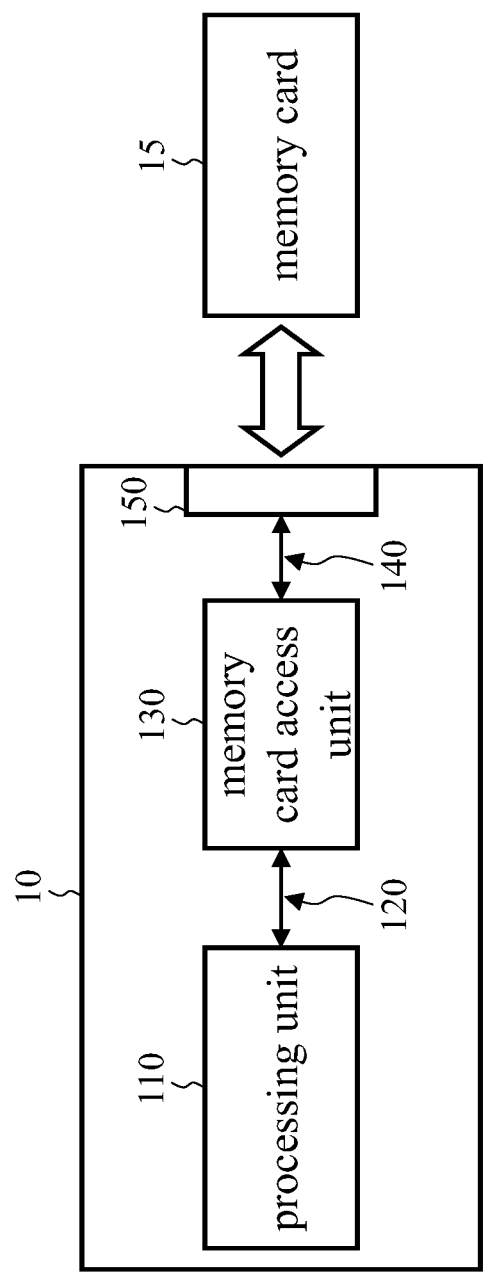
FIG. 1 is a block diagram showing the connection between a memory card and a conventional electronic device.
Figure 2:
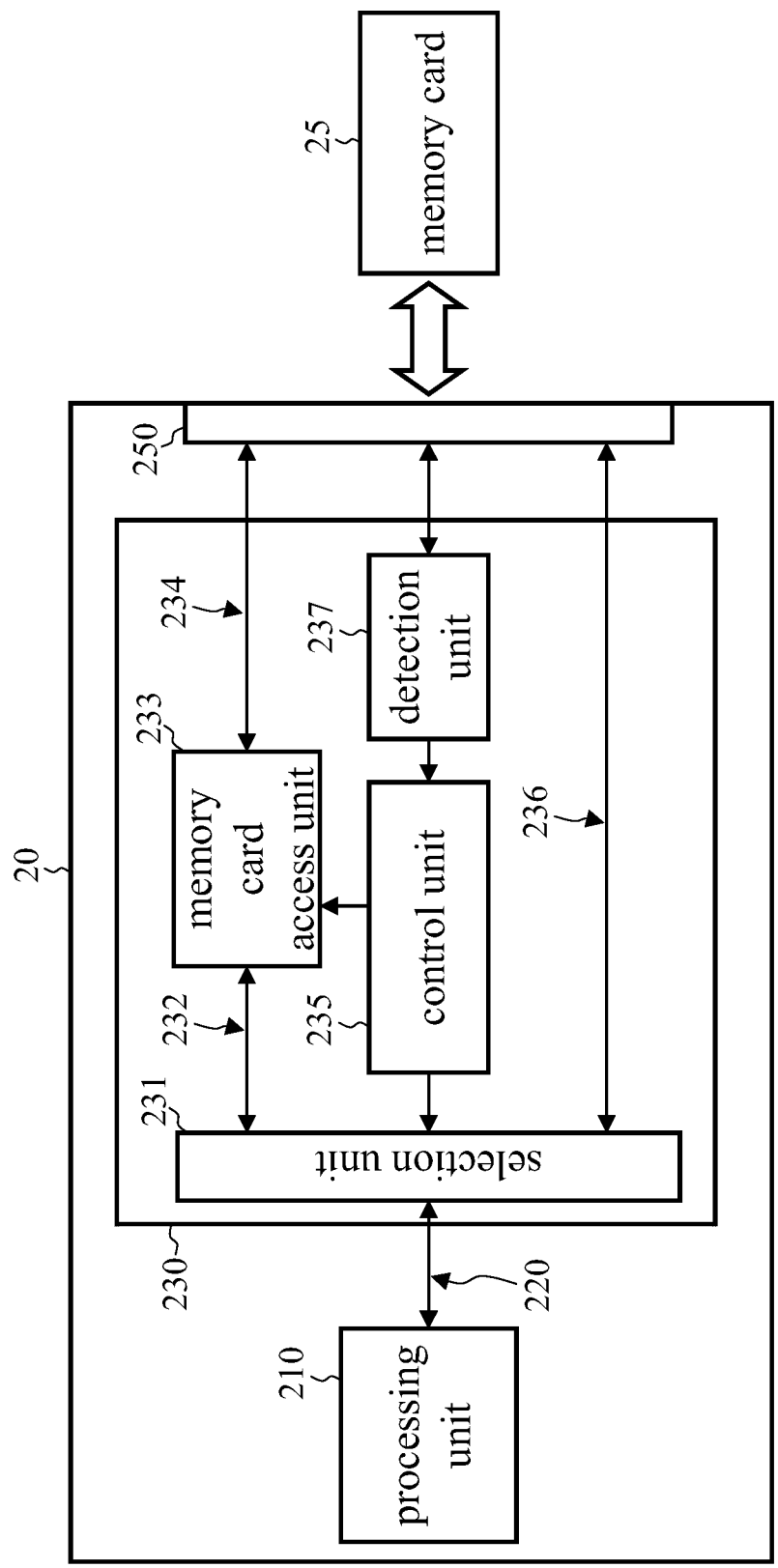
FIG. 2 is a functional block diagram of a memory card access module according to an embodiment of the present invention.

FIG. 2 is a functional block diagram of a memory card access module according to an embodiment of the present invention. The memory card access module 230 is implemented in the electronic device 20 and coupled between the processing unit 210 and the slot 250 of the electronic device 20. The processing unit 210 is a system on chip (SoC) or a chipset of the electronic device 20. For example, the processing unit 210 may be a central processing unit, a microprocessor, or the like. The slot 250 is for the insertion of the memory card 25 or other devices. The memory card access module 230 includes the selection unit 231, the memory card access unit 233, the control unit 235, and the detection unit 237. The transmission interface 220, the transmission interface 232, and the transmission interface 236 are Peripheral Component Interconnect Express (PCI-Express, PCIe for short) interfaces, whereas the transmission interface 234 is a secure digital (SD) interface. One function of the memory card access unit 233 is to provide data format conversion between the PCIe interface and the SD interface. The control unit 235 may be implemented, for example, by a logic circuit or a microcontroller.

FIGS. 3A to 3D are flowcharts of a memory card access method according to an embodiment of the present invention. The detection unit 237 detects whether a memory card is inserted in the slot 250 (step S310). The detection, for example, may be conducted through a card detection pin of the memory card slot. When the control unit 235 learns from the control signal of the detection unit 237 that no memory card is inserted, the control unit 235 controls the electronic device 20 to operate in a predetermined state (step S320). More specifically, the predetermined state may be one of the following two states: state (1) in which the transmission interface 220 is in use, that is, the processing unit 210 and the memory card access unit 233 establish a link through the transmission interface 220 and the transmission interface 232; or state (2) in which the transmission interface 220 is not in use, that is, the processing unit 210 does not establish a link with any device through the transmission interface 220.

Figure 3A:
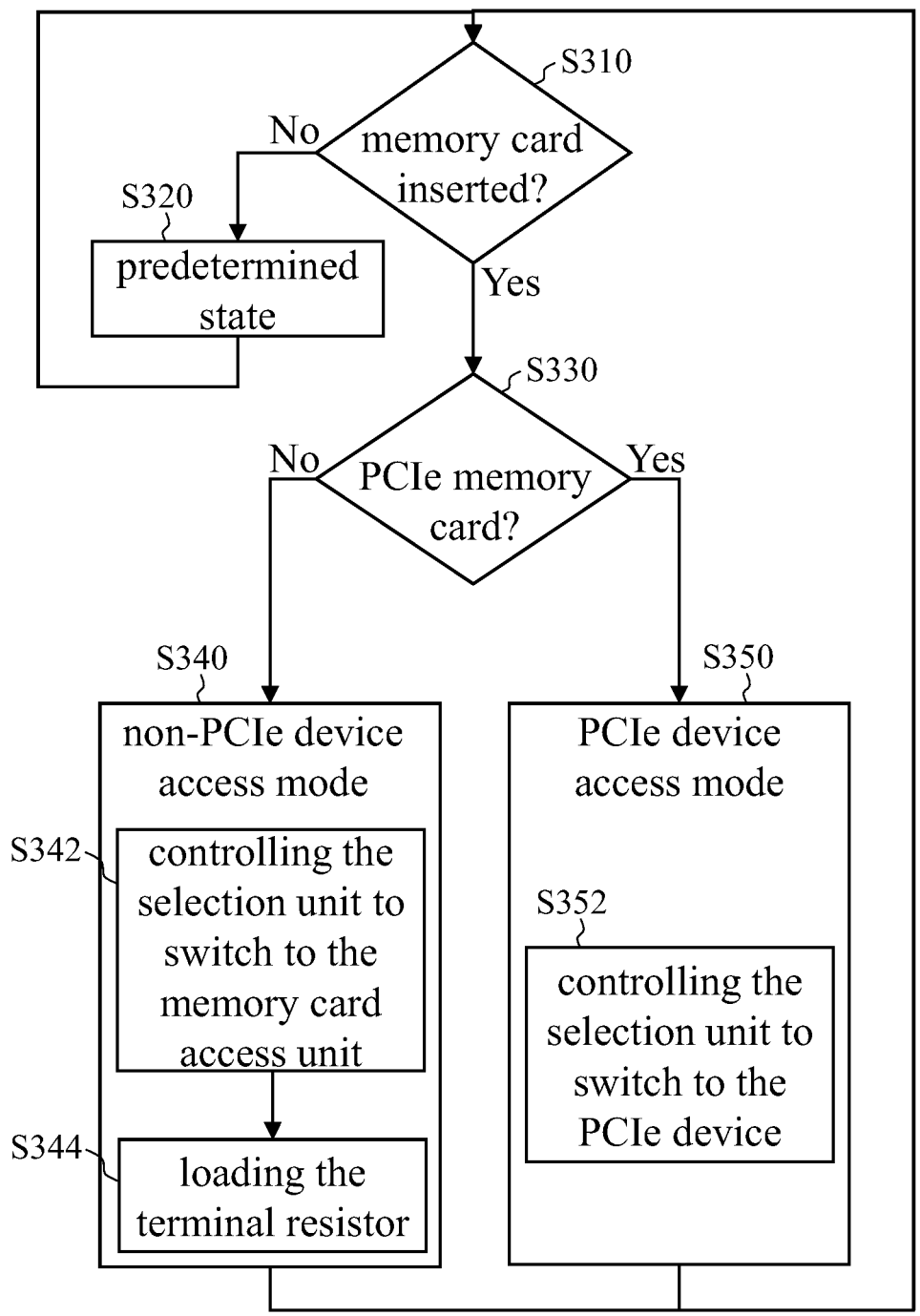
FIGS. 3A to 3D show flowcharts of a memory card access method according to an embodiment of the present invention.
Figure 3B:
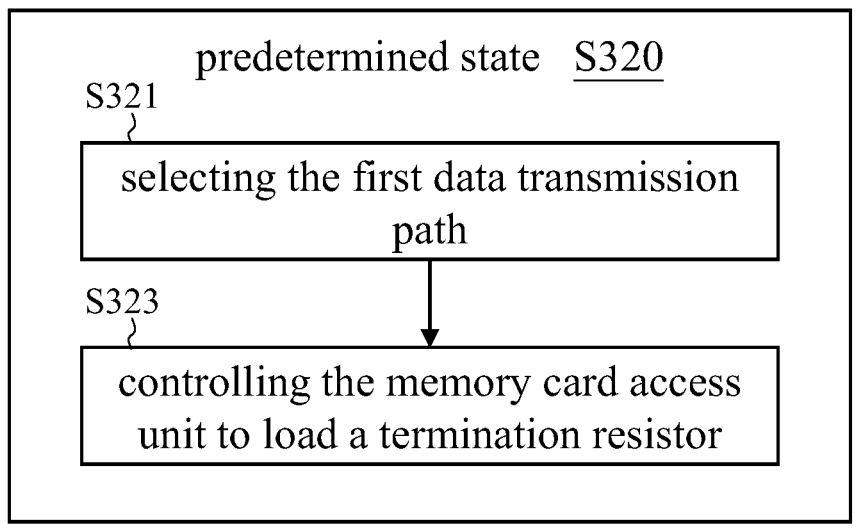
Figure 3C:
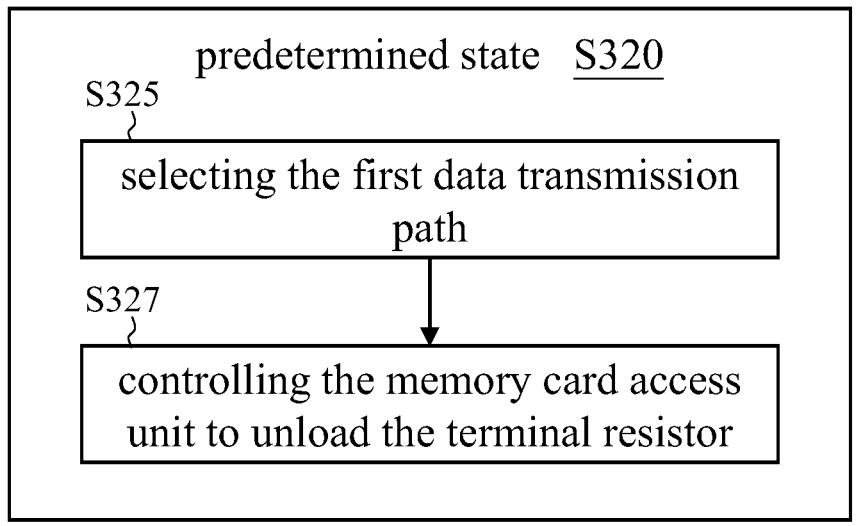
Figure 3D:
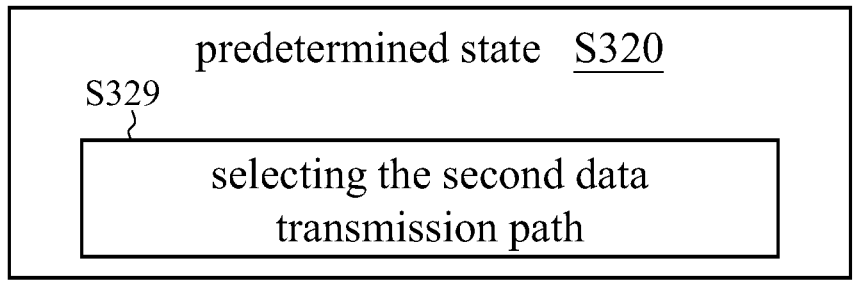

In state (1), the control unit 235 controls the selection unit 231 to select the first data transmission path (including the transmission interface 232, the memory card access unit 233 and the transmission interface 234) (step S321 in FIG. 3B) and controls the memory card access unit 233 to load a termination resistor (step S323 in FIG. 3B). In state (2), the control unit 235 may (A) control the selection unit 231 to select the first data transmission path (step S325 in FIG. 3C) and control the memory card access unit 233 to unload the terminal resistor (step S327 in FIG. 3C); or (B) control the selection unit 231 to select the second data transmission path (including the transmission interface 236) (step S329 in FIG. 3D).

Figure 4:
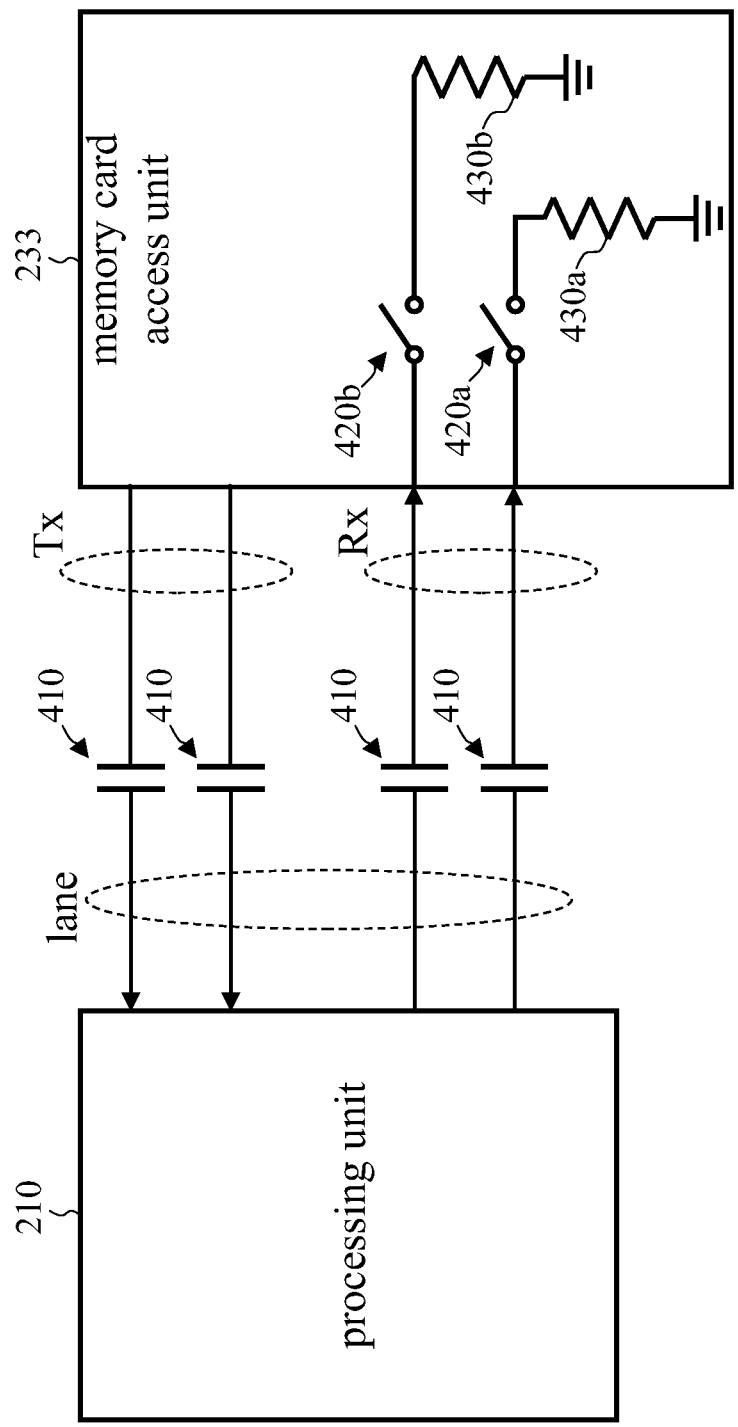
FIG. 4 is a schematic diagram showing the link between the processing unit and the memory card access unit.

The details of loading and unloading a terminal resistor are discussed below. FIG. 4 is a schematic diagram that illustrates the link between the processing unit 210 and the memory card access unit 233, and exemplarily shows a lane of the PCIe interface. Observe that one lane includes a differential transmission pair Tx and a differential reception pair Rx, in which the transmission and reception are from the viewpoint of the memory card access unit 233. The differential transmission pair Tx and the differential reception pair Rx each include two transmission lines, and each transmission line has a coupling capacitor 410. The memory card access unit 233 includes switches 420a and 420b and resistors 430a and 430b. To load the resistor means that the memory card access unit 233 controls the switches 420a and 420b to turn on according to the control signal of the control unit 235, so that the resistors 430a and 430b are connected to the differential reception pair Rx of the PCIe lane. To unload the resistor means that the memory card access unit 233 controls the switches 420a and 420b to turn off according to the control signal of the control unit 235. Note that if the switches 420a and 420b are originally on, the operation of "to load the terminal resistor" means that the memory card access unit 233 is not required to perform any action (that is, the steps associated with "to load the terminal resistor" can be omitted); likewise, if the switches 420a and 420b are originally off, the operation of "to unload the terminal resistor" means that the memory card access unit 233 is not required to perform any action.

Reference is made back to FIG. 3A. After determining that a memory card is inserted in the slot 250 (i.e., the determination result of step S310 is positive), the detection unit 237 further detects the type of the memory card inserted, that is, detects whether the memory card inserted is a PCIe memory card (i.e., a memory card compatible with the PCIe interface) or other memory cards such as an SD memory card (i.e., a memory card compatible with the SD interface) (step S330). The detection unit 237 may use the following two detection methods; these methods, however, are for the purpose of explanation, not for limiting the scope of this invention. The first method is the detection method defined by the PCIe standard; in the first method, the detection unit 237 performs the detection by measuring the charging time of the capacitor(s) using periodic pulses. Specifically, when a PCIe memory card is inserted in the slot 250, the parasitic capacitor(s) on the slot 250 increases, thereby lengthening the charging time. The second method is to determine whether the voltage of the clock pin request (CLKREQ #) of the PCIe interface has changed. A PCIe memory card is initialized when the PCIe memory card is inserted in the slot 250, and, during the initialization, the PCIe memory card requires an external clock. When the PCIe memory card requests the clock from the host (i.e., the electronic device 20), the voltage of the clock pin changes.

The control unit 235 determines whether the memory card access module 230 is to subsequently operate in the non-PCIe device access mode or the PCIe device access mode according to the detection result of the detection unit 237. When the detection unit 237 indicates that the memory card is a non-PCIe memory card (i.e., the determination result of step S330 is negative), the control unit 235 controls the memory card access module 230 to operate in the non-PCIe device access mode (step S340) and otherwise controls the memory card access module 230 to operate in a PCIe device access mode (step S350). In the non-PCIe device access mode, the control unit 235 controls the selection unit 231 to switch to the memory card access unit 233 (step S342) and controls the memory card access unit 233 to load the terminal resistor (step S344); that is, in this mode, the control unit 235 connects the processing unit 210 with the memory card access unit 233 to allow data transmission between them. In the PCIe device access mode, the control unit 235 controls the selection unit 231 to switch to the PCIe device (step S352); that is, in this mode, the control unit 235 enables the processing unit 210 to directly access the PCIe memory card through the transmission interface 236.

Figure 5:
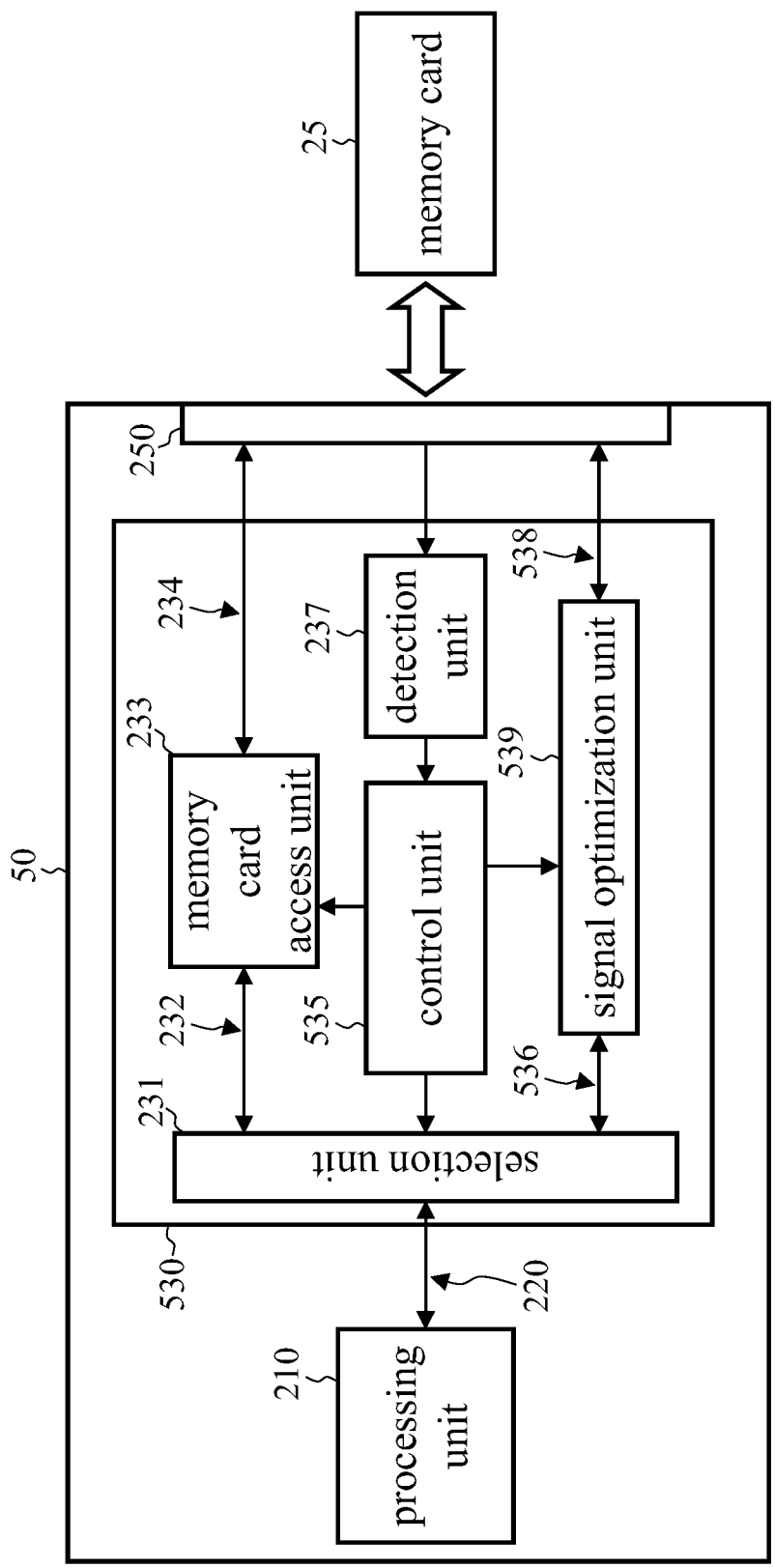
FIG. 5 is a functional block diagram of the memory card access module according to another embodiment of the present invention.

FIG. 5 is a functional block diagram of the memory card access module according to another embodiment of the present invention. The memory card access module 530 is implemented in the electronic device 50 and coupled between the processing unit 210 and the slot 250 of the electronic device 50. The processing unit 210 is an SoC or a chipset of the electronic device 50. The memory card access module 530 includes the selection unit 231, the memory card access unit 233, the control unit 535, the detection unit 237, and the signal optimization unit 539. The transmission interface 536 and the transmission interface 538 are PCIe interfaces. In FIGS. 2 and 5, elements denoted with the same numerals have the same functions and repeated descriptions are thus omitted for brevity. The control unit 535 can be implemented, for example, by a logic circuit or a microcontroller.

Since the memory card 25 and the slot 250 may reduce the performance of data transmission or even cause access errors due to poor contact or terminal oxidation, this embodiment employs the signal optimization unit 539 to perform enhancement (e.g. redriver) and/or retimer on the signals transmitted between the memory card 25 and the processing unit 210, or to add protocol aware and/or other protocol analyzing processes to adjust the protocol content. In accordance with this embodiment, steps S320 and S350 of FIG. 3 are slightly modified.

Figure 6A:
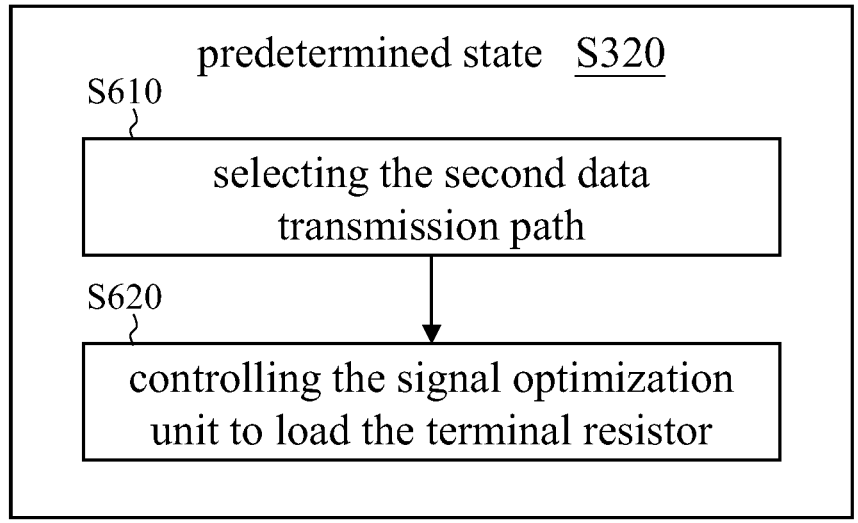
FIGS. 6A to 6C show detailed steps of the memory card access method corresponding to the memory card access module in FIG. 5.
Figure 6B:
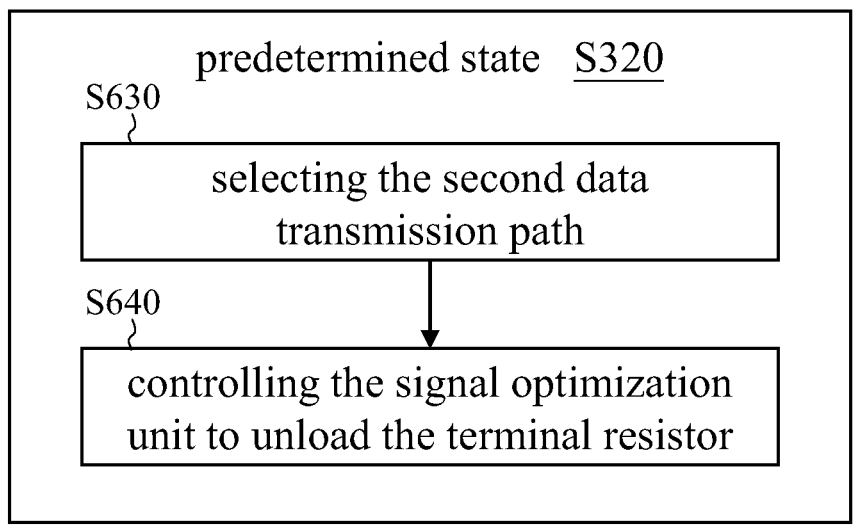

For step S320, in state (1) (i.e., the transmission interface 220 is in use), the control unit 535 may (A) (corresponding to FIG. 3B) control the selection unit 231 to select the first data transmission path (including the transmission interface 232, the memory card access unit 233 and the transmission interface 234) and control the memory card access unit 233 to load the terminal resistor; or (B) (corresponding to FIG. 6A) control the selection unit 231 to select the second data transmission path (including the transmission interface 536, the signal optimization unit 539 and the transmission interface 538) (step S610), and control the signal optimization unit 539 to load the terminal resistor (Step S620). In state (2) (i.e., the transmission interface 220 is not in use), the control unit 535 may (A) (corresponding to FIG. 3C) control the selection unit 231 to select the first data transmission path and control the memory card access unit 233 to unload the terminal resistor; or (B) (corresponding to FIG. 6B) control the selection unit 231 to select the second data transmission path (step S630) and control the signal optimization unit 539 to unload the terminal resistor (step S640).

Figure 6C:
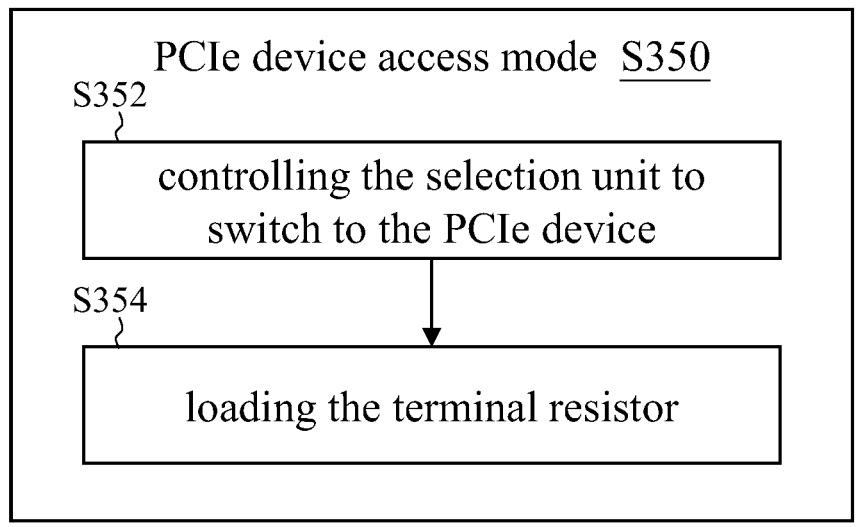

For step S350 (corresponding to FIG. 6C), after step S352, the control unit 535 further controls the signal optimization unit 539 to load the terminal resistor (step S354) so as to establish connections with the processing unit 210 and the memory card 25. Note that for the signal optimization unit 539, an end thereof connected to the processing unit 210 and another end thereof connected to the memory card 25 each include a terminal resistor; both terminal resistors are disposed at the receiving end from the viewpoint of the signal optimization unit 539. Similar to the memory card access unit 233, the signal optimization unit 539 utilizes the switch(es) to load/unload the terminal resistors. The signal optimization unit 539 may be, for example, a redriver circuit and/or a retimer circuit.

Figure 7A:
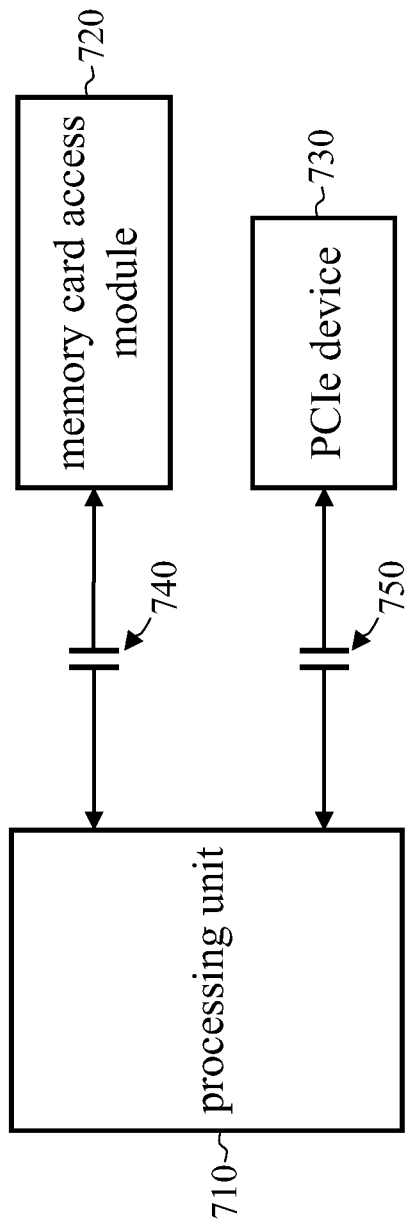
FIGS. 7A to 7B are schematic diagrams showing the sharing of the coupling capacitors of the PCIe interface.
Figure 7B:
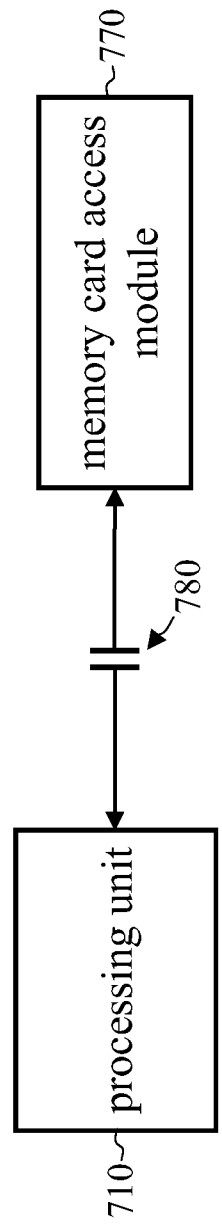

In summary, the memory card access module of the present invention integrates the transmission interfaces of the PCIe memory card and the non-PCIe memory card to provide greater flexibility for the manufacturer of the electronic device in planning the PCIe lanes of the processing unit (i.e., no need to sacrifice other PCIe devices to support two types of memory cards at the same time or no need to integrate other interfaces by making use of many discrete components), as well as to provide users with more user-friendly operations (i.e., both types of memory cards can be inserted in the same memory card slot). In addition, the present invention further makes it possible for the manufacturer of the electronic device to save the coupling capacitors on the circuit, so as to reduce the cost and simplify the design. Specifically, as shown in FIGS. 7A and 7B, when the PCIe interface is not shared (FIG. 7A), the memory card access module 720, which provides functions of reading non-PCIe memory cards, and the PCIe device 730 each take up one PCIe interface, which may include one or more lanes, and each PCIe interface contains a capacitor group 740 or 750. When the PCIe interface is shared (FIG. 7B) (i.e., like the memory card access module 230 of FIG. 3 or the memory card access module 530 of FIG. 5, the memory card access module 770 supports both PCIe devices (including PCIe memory cards) and non-PCIe memory cards), only one capacitor group 780 is needed; that is, the number of capacitors required can be halved, as compared to the case of FIG. 7A.

According to the present invention, the sharing of PCIe interfaces is not limited to PCIe memory cards. Any PCIe device that can be connected to the electronic device through the slot of the electronic device is within the scope of the present invention.

The processing units 210 and 710, the memory card access unit 233, the memory card access modules 230, 530, 720 and 770, the selection unit 231, the control units 235 and 535, the detection unit 237, and the signal optimization unit 539 can be implemented by hardware (e.g., circuits including active and/or passive electronic components).

Since people of ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A device, coupled between a processing unit and a memory card slot, for accessing a memory card, the device comprising:
   a detection unit detecting whether the memory card supports a Peripheral Component Interconnect Express (PCIe) interface;
   a selection unit selecting a first data transmission path or a second data transmission path, wherein the second data transmission path allows the processing unit and the memory card to transmit data through the PCIe interface;
   a memory card access unit, coupled to the selection unit and disposed on the first data transmission path, accessing the memory card and providing data format conversion between a transmission interface and the PCIe interface; and
   a control unit, coupled to the detection unit, the memory card access unit and the selection unit, controlling the selection unit to select the second data transmission path when the detection unit indicates that the memory card supports the PCIe interface, and controlling the selection unit to select the first data transmission path when the detection unit indicates that the memory card does not support the PCIe interface;
   wherein the detection unit further detects whether any memory card is inserted in the memory card slot;
   wherein the control unit controls the selection unit to select the first data transmission path when the detection unit indicates that no memory card is inserted in the memory card slot;
   wherein the memory card access unit comprises a terminal resistor, and when the detection unit indicates that no memory card is inserted in the memory card slot, the control unit further controls the memory card access unit to load the terminal resistor.

2. The device of claim 1, wherein when the detection unit indicates that the memory card does not support the PCIe interface, the control unit further controls the memory card access unit to load the terminal resistor.

3. The device of claim 1, further comprising:
   a signal optimization unit, disposed on the second data transmission path and coupled to the selection unit, enhancing a signal on the second data transmission path.

4. A memory card access method applied to an electronic device, wherein a processing unit of the electronic device can access a memory card via a memory card slot, the method comprising:
   detecting whether the memory card supports a Peripheral Component Interconnect Express (PCIe) interface;
   controlling the processing unit to access the memory card through a first data transmission path, and using a memory card access unit disposed on the first data transmission path to conduct data format conversion between the PCIe interface and a transmission interface when the memory card does not support the PCIe interface;
   controlling the processing unit to access the memory card through a second data transmission path that allows the processing unit and the memory card to transmit data through the PCIe interface when the memory card supports the PCIe interface;
   detecting whether any memory card is inserted in the memory card slot; and
   selecting the first data transmission path or the second data transmission path when no memory card is inserted in the memory card slot;
   wherein the memory card access unit comprises a terminal resistor, and when no memory card is inserted in the memory card slot, the first data transmission path is selected, and the method further comprises a step of controlling the memory card access unit to load the terminal resistor.

5. The method of claim 4 further comprising:
   enhancing a signal on the second data transmission path when the memory card supports the PCIe interface.

6. The method of claim 4, wherein the method further comprising:
   controlling the memory card access unit to load the terminal resistor when the memory card does not support the PCIe interface.

7. A device, coupled between a processing unit and a slot, selectively accessing a Peripheral Component Interconnect Express (PCIe) device directly, the device comprising:
   a detection unit detecting whether a device connected to the slot is the PCIe device;
   a selection unit selecting a first data transmission path or a second data transmission path, wherein the second data transmission path allows the processing unit and the PCIe device to transmit data through a PCIe interface;
   a memory card access unit, coupled to the selection unit and disposed on the first data transmission path, accessing a memory card and providing data format conversion between a transmission interface and the PCIe interface; and
   a control unit, coupled to the detection unit, the memory card access unit and the selection unit, controlling the selection unit to select the second data transmission path when the detection unit indicates that the device is the PCIe device, and controlling the selection unit to select the first data transmission path when the detection unit indicates that the device is not the PCIe device;

wherein the detection unit further detects whether any device is inserted in the slot, and the control unit controls the selection unit to select the first data transmission path or the second data transmission path when the detection unit indicates that no device is inserted in the slot;

wherein the memory card access unit comprises a terminal resistor, and when the detection unit indicates that no device is inserted in the slot, the control unit controls the selection unit to select the first data transmission path and controls the memory card access unit to load the terminal resistor.

8. The device of claim 7, further comprising:

a signal optimization unit, disposed on the second data transmission path and coupled to the selection unit, enhancing a signal on the second data transmission path.

9. The device of claim 7, wherein the control unit controls the memory card access unit to load the terminal resistor when the detection unit indicates that the device is not the PCIe device.

* * * * *